United States Patent
Rooney et al.

(10) Patent No.: US 11,500,886 B2
(45) Date of Patent: Nov. 15, 2022

(54) FINDING LOCATIONS OF TABULAR DATA ACROSS SYSTEMS

(71) Applicant: International Business Machines Corporation, Armonk, NY (US)

(72) Inventors: John G. Rooney, Zurich (CH); Luis Garcés Erice, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 45 days.

(21) Appl. No.: 17/119,704

(22) Filed: Dec. 11, 2020

(65) Prior Publication Data

US 2022/0188312 A1    Jun. 16, 2022

(51) Int. Cl.
*G06F 16/2458* (2019.01)
*G06F 16/22* (2019.01)
*G06F 21/62* (2013.01)
*G06F 16/25* (2019.01)

(52) U.S. Cl.
CPC ........ *G06F 16/2462* (2019.01); *G06F 16/221* (2019.01); *G06F 16/2255* (2019.01); *G06F 16/258* (2019.01); *G06F 21/6227* (2013.01)

(58) Field of Classification Search
CPC .............. G06F 16/2462; G06F 16/221; G06F 16/2255; G06F 16/258; G06F 21/6227
See application file for complete search history.

(56) References Cited

U.S. PATENT DOCUMENTS

| | | |
|---|---|---|
| 5,802,528 A | 9/1998 | Oki |
| 2012/0066214 A1 | 3/2012 | Nelke |
| 2014/0372374 A1 | 12/2014 | Bourbonnais |

(Continued)

FOREIGN PATENT DOCUMENTS

| | | |
|---|---|---|
| CN | 104714931 B | 4/2019 |
| CN | 110427992 A | 11/2019 |
| EP | 3070620 A1 | 9/2016 |

OTHER PUBLICATIONS

"Using database statistics' checksum for quick data consistency verification", An IP.com Prior Art Database Technical Disclosure, Authors et. al.: Disclosed Anonymously, IP.com No. IPCOM000258424D, IP.com Electronic Publication Date: May 10, 2019, 2 pages.

Kamran et al., "A Comprehensive Survey of Watermarking Relational Databases Research", arXiv:1801.08271v1 [cs.CR], Jan. 25, 2018, 20 pages.

(Continued)

*Primary Examiner* — Dangelino N Gortayo
(74) *Attorney, Agent, or Firm* — Nicholas A. Welling

(57) ABSTRACT

An approach to finding data locations may be provided. A first synopses, which corresponds to first tabular data may be provided. An auxiliary data storage system may be scanned to identify second tabular data stored in the auxiliary data storage system. A second synopses may be obtained, in which the synopses correspond to the second columns of second tabular data. The synopsis may be computed for each second column of the second columns, according to a numeric representation of contents of cells of said each second column. The computed synopsis may include a vector of m descriptors. The two sets of one or more descriptors may be compared. A subset of the descriptors of the second synopses may be compared with corresponding descriptors of the first synopses, to identify potential matches between the second tabular data and the corpus of first tabular data.

20 Claims, 6 Drawing Sheets

(56) References Cited

U.S. PATENT DOCUMENTS

| | | |
|---|---|---|
| 2015/0169720 A1 | 6/2015 | Byron |
| 2016/0275150 A1 | 9/2016 | Bournonnais |
| 2019/0018889 A1 | 1/2019 | Colgrove |
| 2019/0102427 A1* | 4/2019 | Chakkappen ..... G06F 16/24532 |
| 2019/0347268 A1* | 11/2019 | Griffith ................. G06F 16/221 |
| 2019/0384571 A1 | 12/2019 | Oberbreckling |
| 2020/0012626 A1 | 1/2020 | Walters |
| 2020/0175559 A1* | 6/2020 | Saito ................... G06F 16/2456 |
| 2020/0380379 A1* | 12/2020 | Tatti ........................ G06N 5/025 |
| 2021/0149896 A1* | 5/2021 | Yu ........................ G06K 9/6215 |
| 2021/0406266 A1* | 12/2021 | Chan .................... G06N 3/0454 |
| 2021/0406717 A1* | 12/2021 | Tauheed ............. G06F 16/2282 |

OTHER PUBLICATIONS

Moia et al., "Similarity Digest Search: A Survey and Comparative Analysis of Strategies to Perform Known File Filtering Using Approximate Matching", Hindawi, Security and Communication Networks, vol. 2017, Article ID 1306802, 18 pages, <https://doi.org/10.1155.2017.1306802>.

Roussev, Vassil, "Data Fingerprinting With Similarity Digests", Chapter 15, Advances in Digital Forensics VI, IFIP AICT 337, 2010, pp. 207-226.

International Search Report and Written Opinion, International Application No. PCT/IB2021/060784, International Filing Date Nov. 21, 2021.

* cited by examiner

| Company names | Headquarters | #Employees | Revenue 2019 (billions, US$) | Main activity | Last Event |
|---|---|---|---|---|---|
| Company 1 | IT | 15000 | 3.30 | Cloud | 1/30/2018 |
| Company 2 | US | 350000 | 77.00 | Cloud, AI | 10/31/2019 |
| Company 3 | UK | 45000 | 9.90 | AI | 4/11/2016 |
| Company 4 | FR | 48000 | 10.56 | AI | 2/2/2018 |
| Company 5 | DE | 60000 | 13.20 | IT infrastructure | 6/22/2019 |
| Company 6 | CN | 600500 | 132.11 | Cloud, AI | 9/28/2020 |
| Company 7 | DE | 35000 | 7.70 | IT infrastructure | 3/2/2015 |
| Company 8 | CA | 24000 | 5.28 | Security | 11/12/2017 |
| Company 9 | MX | 4800 | 1.06 | Mobile | 5/18/2019 |
| Company 10 | CH | 2500 | 0.55 | Security | 7/23/2014 |
| Company 11 | FR | 12000 | 2.64 | Data analytics | 2/19/2018 |
| Company 12 | CA | 5000 | 1.10 | Data analytics | 10/10/2020 |
| Company 13 | US | 29000 | 6.38 | Cloud | 12/8/2017 |
| Company 14 | US | 75000 | 16.50 | AI | 8/2/2014 |
| Company 15 | SE | 2400 | 0.53 | Digital workplace | 2/13/2018 |
| Company 16 | AR | 6900 | 1.52 | Data analytics | 9/14/2019 |
| Company 17 | BR | 80000 | 17.60 | Mobile | 2/11/2012 |
| *String(1)* | *String(1)* | *Integers* | *Reals* | *String(2)* | *Date* |

| | Company names | Headquarters | #Employees | Revenue 2019 | Main activity | Last event |
|---|---|---|---|---|---|---|
| | 284164905 | 15204510 | 15000 | 3.30 | -1.388 | 1517266800 |
| | 284230442 | 16711849 | 350000 | 77.00 | -0.415 | 1572476400 |
| | 284295979 | 16187553 | 45000 | 9.90 | -1.466 | 1460329200 |
| | 284361516 | 14680217 | 48000 | 10.56 | -1.466 | 1517526000 |
| | 284427053 | 13566090 | 60000 | 13.20 | 1.894 | 1561158000 |
| | 284492590 | 14024850 | 600500 | 132.11 | -0.415 | 1601247600 |
| | 284558127 | 13566090 | 35000 | 7.70 | 1.894 | 1425250800 |
| | 284623664 | 13172869 | 24000 | 5.28 | -1.314 | 1510441200 |
| | 284689201 | 15990950 | 4800 | 1.06 | -1.314 | 1558134000 |
| | 340329305 | 13631628 | 2500 | 0.55 | -1.314 | 1406070000 |
| | 340394842 | 14680217 | 12000 | 2.64 | 2.653 | 1518994800 |
| | 340460379 | 13172869 | 5000 | 1.10 | 2.653 | 1602284400 |
| | 340525916 | 16711849 | 29000 | 6.38 | -1.388 | 1512687600 |
| | 340591453 | 16711849 | 75000 | 16.50 | -1.466 | 1406934000 |
| 25 | 340656990 | 15532185 | 2400 | 0.53 | 1.515 | 1518476400 |
| | 340722527 | 14024852 | 6900 | 1.52 | 2.653 | 1568415600 |
| | 340788064 | 14155925 | 80000 | 17.60 | -1.314 | 1328914800 |
| | 251 | 252 | 253 | 254 | 255 | 256 |

| Statistical descriptors | String(1) | String(1) | Integers | Reals | String(2) | Date |
|---|---|---|---|---|---|---|
| Entropy: $f_1$ | 2.83 | 3.76 | 2.83 | 2.83 | 4.88 | 2.83 |
| Skewness: $f_2$ | 0.13 | 0.34 | 2.87 | 2.87 | 0.67 | -0.85 |
| | 261 | 262 | 263 | 264 | 265 | 266 |

FINDING LOCATIONS OF TABULAR DATA ACROSS SYSTEMS

BACKGROUND

The invention relates in general to computer-implemented techniques for finding data locations. In particular, it is directed to a computer program product and a computer-implemented method of finding tabular data, which rely on statistical fingerprinting of tabular columns to reduce computational effort to identify potential matches between tabular data stored in different storage systems.

Typically, a company has many systems of transaction and systems of record, which record data related to the company's business. The data are often stored in relational database tables. Such tables are said to be "rectangular" in that the data are arranged in columns; they are typically displayed as rows and columns of a table to users. It is often the case that data from these core relational systems are copied to other systems, e.g., for the purpose of analytics or other normal business. The form of the data remains rectangular, but they may be stored in different formats, under different file names, and on a variety of storage systems. As data are copied or recopied, and transformed, it becomes increasingly difficult for a company to know where such data have been moved to.

This is compounded by the fact that users may gain access to a restricted data source through a well governed and managed process and make it available in other contexts without authorization or governance controls. As a result, datasets containing sensitive data may come to be stored in a storage system without access control and/or encryption.

This is often unintentional and more due to negligence than malicious intent, as illustrated in the following examples. A user may unknowingly move data from a fitting enterprise system to an inapposite system. The user may further come to transform the data, only taking a subset thereof, or removing some rows or columns. Furthermore, the user may rename the datafile, so that the name under which the data is stored has no relation with that of the original datafile. A sales representative might take a random sample of 10% of a company's major customers, remove the address field and unknowingly save it in a file that is stored in a third-party storage service.

Solutions have been developed to tackle such problems, which mostly involve data fingerprinting and watermarking. Data fingerprinting allows a small digest of a dataset to be created, whereby two identical datasets have the same digest. The common way of doing this is to produce hashes (also called fingerprints). Hashes, however, use every bit of information as input, such that that a change of a single bit can lead to an entirely different digest. i.e., hashes are not robust against even the smallest alterations. An improvement is obtained by using a sliding window of distinct hashes and measures of most representative bit patterns within the dataset. Such a type of fingerprinting, however, works at the level of bits. However, the same relational data can be stored in a variety of storage systems within different data layouts, such that bit-level fingerprinting is mostly insufficient or inapplicable.

More commonly, a watermark can be inserted into the data such that the dataset can be recognized even if it is moved to a different storage system and changed. Such techniques have the major disadvantage that all rectangular datasets produced in the organization must be systematically watermarked, using a prescribed algorithm, which is typically not available on the tools used to create the data. This is impractical for the (hundreds of) thousands of datasets that are typically created and updated in a large organization, across a large number of data storage systems, many of which are not even administered by the organization itself (e.g., by a cloud provider).

SUMMARY

According to a first aspect, the invention is embodied as a computer-implemented method of finding data locations. The method is performed in a context assuming that first synopses have been made available. The synopses correspond to columns of a corpus of tabular data stored in one or more reference data storage systems. Such tabular data and corresponding columns are referred to as "first tabular data" and "first columns", for the sake of distinction. An auxiliary data storage system is scanned to identify further tabular data ("second tabular data") stored in the auxiliary data storage system. The second tabular data include columns, referred to as "second columns". Next, synopses are obtained ("second synopses"), which correspond to the second columns of the second tabular data. To that aim, a synopsis is computed for each second column of the second columns, according to a numeric representation of contents of cells of said each second column. The computed synopsis includes a vector of m descriptors, where m is larger than or equal to 1, although it is typically larger, e.g., m≥6. Each descriptor is a measure of the numeric representation of the contents of the cells of the corresponding column. A descriptor may for example be a statistical measure, such as a mean, a standard deviation, a skewness, an entropy, a mean frequency, etc. Finally, two sets of one or more descriptors are compared. Namely, a subset, at least, of the descriptors of the second synopses are compared with corresponding descriptors (i.e., descriptors of the same type) of the first synopses, to identify potential matches between the second tabular data and the corpus of first tabular data.

In preferred embodiments, the comparison is limited to only a subset of the descriptors. This subset can be identified prior to comparing the two sets, e.g., it may only include those descriptors having most unusual values in view of corresponding descriptors in the corpus. Relying on a limited set of descriptors eases the data transfers (required to perform the comparisons) and the storage requirements.

According to another aspect, the invention is embodied as a computer program product for finding data locations. The computer program product comprises a computer readable storage medium having program instructions embodied therewith. The program instructions are executable by the processing means, so as to cause the processing means to implement all the steps of the above method.

Computerized methods and computer program products embodying the present invention will now be described, by way of non-limiting examples, and in reference to the accompanying drawings.

BRIEF DESCRIPTION OF THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the present disclosure, in which:

FIG. 2 shows an example of a (small) table as initially identified on the auxiliary data storage system, as in embodiments.

FIG. 3 shows a numeric representation of the table of FIG. 2, after conversion of some of its columns, as needed in embodiments.

FIG. 4 shows a set of column-level synopses, as obtained for the columns of the numeric table of FIG. 3, according to embodiments. Each synopsis corresponds to one column and includes a set of statistical descriptors. Only two statistical descriptors are shown in this example, for simplicity. A subset of the most unusual descriptor values (shown in bold characters) are selected to form a fingerprint of the table, as in embodiments.

The accompanying drawings show simplified representations of devices or parts thereof, as involved in embodiments. In particular, the depicted tables are purposely small and their records are purposely simplified, to ease the exposition. Similar (or functionally similar) elements in the figures have been allocated the same numeral references, unless otherwise indicated.

DETAILED DESCRIPTION

The following description is structured as follows. First, general embodiments and high-level variants are described in section 1. Section 2 addresses more specific embodiments; it notably includes a detailed description of the flow of FIG. 6. Section 3 concerns technical implementation details. Note, the present method and its variants are collectively referred to as the "present methods". All references Sn (e.g., S10, S15, etc.) refer to methods steps of the flowchart of FIG. 6, while numeral references pertain to physical parts or components of the systems shown in FIG. 1, or to data structures and components thereof, as involved in embodiments of the invention.

In reference to FIGS. 1-6, an aspect of the invention is first described, which concerns a computer-implemented method of finding data locations.

Figure 1:
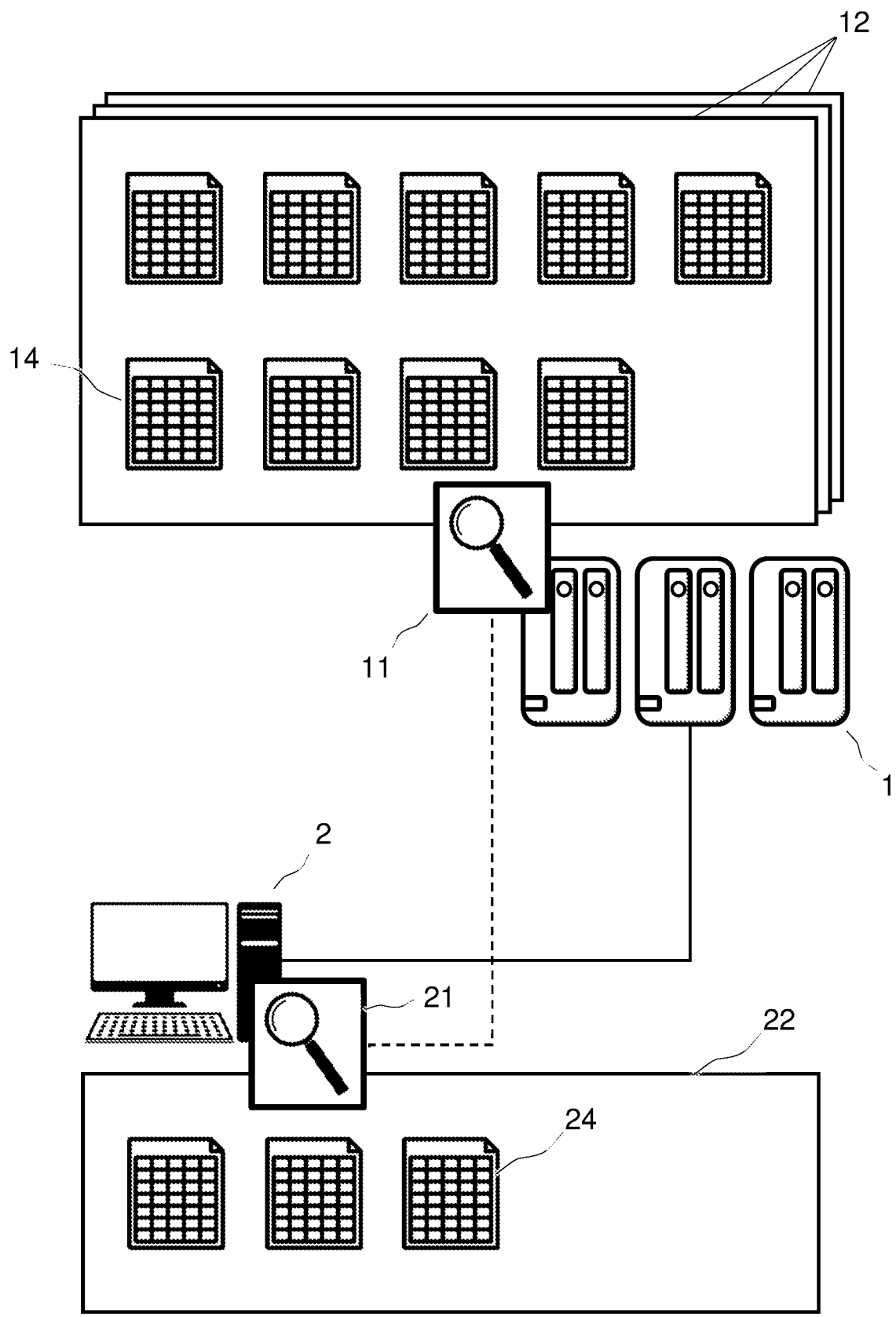
FIG. 1 schematically depicts two data storage systems. A corpus of first tabular data are stored in reference data storage systems, whereas second tabular data are stored in an auxiliary data storage system, as in embodiments.

FIG. 1 depicts the technical context in which the method is performed. A corpus 12 of tabular data 14 are stored in one or more reference data storage systems 1. The systems 1 may notably include systems of transaction, systems of record, (tiered) storage systems, etc., as usual in many companies. In other words, the storage systems 1 include computers and storage means.

The tabular data include columns, for which synopses are assumed to be available. Such synopses are described below in detail. As indicated in the summary, the tabular data stored in the system 1 are referred to as "first tabular data", which include "first columns". An auxiliary data storage system 2 may similarly store additional tabular data 24 (referred to as "second tabular data"), also including columns. Tabular data means that the data are arranged in columns, i.e., rectangular data. Tabular data can typically be represented as one or more tables (with rows and columns) and stored as files that capture the corresponding data structures. In the context of FIG. 1, each of the systems 1, 2 may potentially store a large number of such tabular data 14, 24. The tabular data 24 may for example form part of a database or any folder 22.

The term "column" is here defined as in relational databases. That is, a column is a set of data values, sometimes called records, although records are also sometimes used to refer to entire rows). Such data values usually are of a same type (e.g., numeric data, text or any type of strings, images, audio files, videos, etc.). A column is typically labelled (and thereby identified) by a name or any type of strings, a number, or a code, which is considered as an attribute of the column, rather than a record thereof. Each row includes a data value for each of the columns. I.e., each row can be interpreted as a set of tuples. A cell (also called field) is the intersection of a row and a column; it corresponds to one particular record of a column.

An example of tabular data is shown in FIG. 2, which captures company information, where columns are identified by the following names: "Company names", "Headquarters", "#Employees", "Revenue 2019 (billions, US$)", "Main activity", and "Last event". FIG. 2 further shows corresponding records, purposely simplified. Each column comprise data of a same type. In the accompanying drawings, columns are represented vertically (without prejudice), as usual. Yet, the term "column" does not preclude a horizontal representation thereof, it being noted that rows and columns of a table can easily be transposed.

The present method may be performed by one or more computerized entities 11, 21, e.g., in a distributed manner. Such an entity may primarily operate at the auxiliary system 2, at the reference system 1, or both at the reference and the auxiliary systems. E.g., the method may be implemented by an application running on one or each of the systems 1, 2, and typically allowing or requiring exchanges between the two systems 1, 2. In variants, the method is performed by an external computerized entity, which suitably interacts with each system 1, 2, as needed to perform steps of the method. In embodiments, the method relies on a stream-processing, distributed messaging system to communicate data and enable the required operations. In variants, however, the method may simply rely on a web service, for example.

While synopses (the "first synopses") are assumed to be available for the first tabular data, this is not necessarily (and typically not) the case for the second tabular data on the auxiliary systems 2, at least not prior to perform the present method. Thus, the auxiliary data storage system 2 needs to be scanned (step S15 in FIG. 6) to identify tabular data 24 stored therein, i.e., the "second tabular data". Like the first tabular data, the second tabular data include columns, referred to as the "second columns".

Next, synopses 261-266 (the "second synopses") are obtained at steps S20-S45. The second synopses respectively correspond to the second columns of the second tabular data 24. That is, the second synopses are obtained by computing (step S40) a synopsis for each of the second columns. Each synopsis is computed according to a numeric representation 251-256 of contents of cells of the corresponding column. Eventually, a synopsis includes a vector of m descriptors, where m≥1 (though m is typically larger, e.g., m≥6). Dozens of descriptor types can be contemplated, if needed, and as discussed later in detail. Each descriptor is a measure, such as a statistical measure, of the numeric representation 251-256 of the corresponding column, see FIGS. 3 and 4.

Finally, two sets of one or more descriptors (each) are compared at step S70, in view of identifying potential matches between the second tabular data 24 and the corpus of first tabular data 14. Namely, at least a subset of the descriptors of the second synopses 261-266 (as obtained at steps S20-S45) are compared S70 with corresponding descriptors 16 of the first synopses, i.e., descriptors of the same type. That is, an arithmetic mean is compared to another arithmetic mean, an entropy is compared to another entropy, etc. If the compared descriptors sufficiently correspond (S75: Yes), as a whole, then a match is found between the second tabular data 24 and tabular data 14 in the corpus.

The above method is typically performed repeatedly, for several tables of several auxiliary storage systems 2 (as suggested in the flow of FIG. 6, see steps S80-S10 and S90-S20), as necessary to adequately find data location. The method may notably be performed to track locations of tabular data.

Note, the intended applications of the method do not aim at inappropriately or wrongfully tracking data such as personal user data. Rather, such applications typically aim at securing or limiting the spread of proprietary data and confidential data, such business, trade, and technical secrets, for example, or at identifying redundantly stored data. Technically speaking, the aim of this method is to drastically simplify computations required to adequately find tabular data across several storage systems, e.g., of a company. Identifying a match between tables stored on different locations can be very challenging, computationally speaking, especially as tables might be only partly copied and pasted in other locations, or otherwise modified, as discussed in the background section. In such cases, using mere hashes (fingerprints) of the whole tables does not permit to find the data, as explained in the background.

To address this challenge, the present method involves permissive descriptors, which are applied to column records, rather than whole tables. This typically require converting some or all of the column records, prior to computing the descriptors. Such descriptors can notably be statistical descriptors, allowing summary statistics of the numeric representations of the columns of the tables. Because columns typically contain data of same types, statistical descriptors can adequately capture essential aspects of their numeric representations and therefore serve as permissive fingerprints 26, i.e., permissive to modifications. Statistical measures are indeed permissive, insofar as close sets of numeric values result in close statistical measures. Suitable statistical measures may for instance include, statistical averages, e.g., arithmetic, geometric, harmonic means, or any means obtained from the generalized mean formula or the generalized f-mean, for example. Other descriptors may include the median, mode, range, variance, standard dispersion, central moments, etc. In general, suitable statistical descriptors may relate to the location, the spread, and/or the shape of the corresponding numeric values. Beyond statistical descriptors, other descriptors such as locality-sensitive hashing and locality-sensitive hashing fingerprints may be used, which have similar properties.

A set of descriptors can accordingly be used for each column, as permissive fingerprints of this column. A partial duplicate of a column may essentially retain same statistical properties of the original column. Still, the multiplicity of the descriptors used (where m≥2) makes it possible to compensate for the information lost in the statistical description, to avoid false positives in the comparisons S70. And because the descriptors apply to columns, tables that are modified by deleting some of the columns may still partly match the original tables. As one understands, the proposed approach is permissive to modifications, not only because of the nature of the descriptors used (e.g., statistical descriptors) but also due to the granularity at which they are applied (columns).

As a result, this approach allows partial matches to be found, contrary to fingerprinting methods relying on hashes of the whole tables. In other word, the present approach makes it possible to determine, with a certain probability, whether relocated tabular data 24 corresponds, wholly or partly, to tabular data 14.

Because of the number m of descriptors is typically much smaller than the number of records as typically contained in a column, the present methods remain computationally tractable, even for a company storing 100,000s or more of tables through 1,000s or more of computerized storage systems. In addition, because the method scan the tables a posteriori, users are not required to change the way the tabular data are produced or updated, contrary to watermarking methods.

All this is now described in detail, in reference to particular embodiments of the invention. As said, the synopses are computed S40 based on numeric data, whereas some of the columns may initially include other types of data, as exemplified in FIG. 2. In this example, the initial table includes columns that contain integer numbers ("#Employees", third column) or real numbers ("Revenue 2019 (billions, US$)", fourth column). Such columns may not require any conversion as descriptors can directly be computed (step S40, after step S30: No). I.e., the cells already consist of numeric values, which may already be suitable for computing the corresponding synopses. However, some of the columns includes strings ("Company names", "Headquarters", first and second columns) or lists of strings ("Main activity", penultimate column). Other columns may include dates, which may possibly be stored in a format (e.g., "Nov. 6, 2020") that does not permit a direct computation of the descriptors. Thus, in embodiments, the records (i.e., the contents of the cells) of such columns need be converted S34 into respective numeric values. Doing so leads to a numeric representation of the corresponding columns. Eventually, suitable numeric representations 251-256 are obtained for each of the columns, as depicted in FIG. 3. In FIG. 3, numeral reference 25 denotes a numeric representation of the initial tabular data 24, after conversion of some of the columns.

In other words, contents of the cells of each second column may need be converted into respective numeric values to obtain a suitable numeric representation, unless the cells already consist of values suitable for obtaining the synopsis. Typically, column data that already consist of numeric values do not need conversion. Similarly, some textual data allow metrics to be directly extracted from the text (e.g., fractions of words that are not in a dictionary, numbers of unique words, etc.). Thus, textual data may not necessarily need to be converted. In addition, dates can typically be manipulated and computed on by many computer and software packages to produce numeric values, such that dates may not always need be converted either. So, whether to convert the initial column data also depends on the conversion methods that are available.

In that respect, the conversion method chosen preferably depends on the type of data values stored in the columns. That is, the present methods may first determine whether a column need S30 be converted into numeric values, and, if so (S30: yes), convert the cells of this column into respective numeric values. To that aim, the present methods may seek to identify data type values representing the types of data contained in the cells of the columns. Such data type values may for instance be already stored as attributes of the tables (and thus be available), as assumed in FIG. 2, which shows such data types (in italic, as human-readable strings) at the bottom of the table. The data type values do not form part of the column records. In this example, they are denoted by "String(1)", "String(1)", "Integers", "Reals", "String(2)", and "Dates", where String(1) refers to single strings, while String(2) refers to lists of strings (e.g., a table of strings). In variants, such data types may be determined using simple tests, if necessary. In both cases, the contents of the cells may be converted into respective numeric values based on a conversion method selected S32 according to the corresponding data type.

For example, the conversion method selected S32 may be a hashing method, which may be sufficient for unrelated strings, such as company names or country codes, as done for the first and second columns of the table shown in FIG. 2. In other cases, a locality-sensitive hashing method or a locality-preserving hashing method may be more appropriate to preserve distances between related records. Note, locality-preserving and locality-sensitive hashing methods may not only be used to convert S34 the original data but also to subsequently obtain S40 digests, i.e., descriptors. In still other cases, a feature extraction method may be used, as done for the penultimate column of FIG. 2. In that case, the extraction uses a word segmentation of the flattened lists of strings in each record; the obtained vectors are subsequently projected in a 1D space using dimension reduction techniques.

Closely related, embedding algorithms may be used for text, etc. Other feature extraction/dimension reduction schemes may for instance be used for images, mixed data types, or numeric tables, as well as for audio files and videos, if needed. Note, suitable feature extractors may be trained over columns of the same type, as available in the corpus. Feature extractions are preferably followed by a dimension reduction step, e.g., to 1D space, so as to obtain a single numeric value for each cell of the column of interest.

For dates as shown in the last column, simple conversion schemes exist, which can be used to convert date values (as initially stored in any format) into, e.g., Unix timestamps, as done in FIG. 3.

Not only the conversion methods selected but also the sets of descriptors chosen may depend on the types of data values of the columns. The example of FIG. 4 assumes only two types of descriptors (i.e., entropy and skewness, denoted by $f_1$ and $f_2$), for simplicity. Such descriptors are further assumed to be the same across the various column, again for simplicity. However, it will be apparent to the one skilled in the art that different sets of descriptors may be chosen based on the types of data contained in the columns. For example, entropy is usually a satisfactory descriptor that can be used for any kind of numeric data. However, an arithmetic average is sometimes useless, such that other descriptors (e.g., dispersion statistics, autocorrelation, minimum, maximum, mode, etc.) may be preferred.

Figure 5:
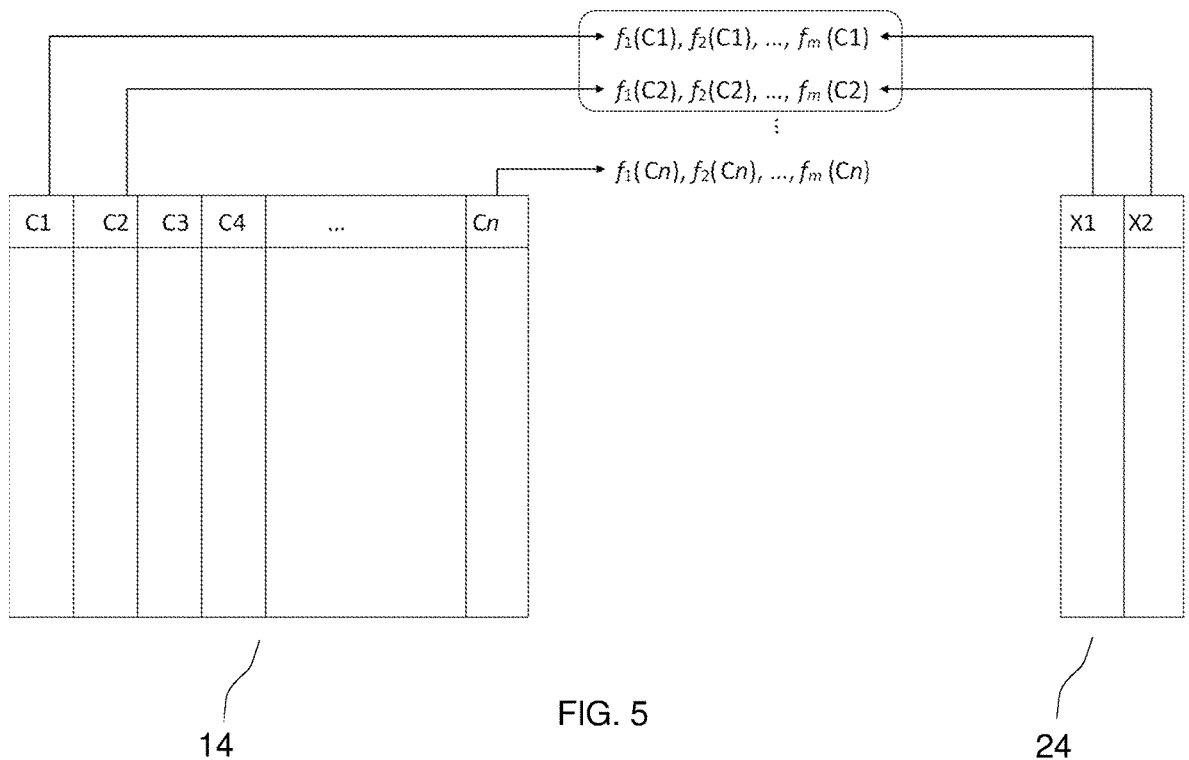
FIG. 5 schematically illustrates how synopses can be used to identify a match between a given table on the right-hand-side (RHS) and a reference table on the left-hand-side (LHS), as in embodiments.

In simple embodiments, all the descriptors of the second synopses 261-266 (as computed at step S40) are used in the comparison performed at step S70, i.e., to compare with corresponding descriptors 16 of the first synopses and identify potential matches. In that respect, FIG. 5 schematically depicts sets of synopses as computed for tabular data 14, 24.

The LHS tabular data 14 includes columns C1 . . . Cn; it is a table of the corpus, duly stored somewhere in the reference systems 1. The RHS tabular data 24 includes only two columns X1, X2. This tabular data 24 is assumed to have been discovered through a systematic scanning process S15 in this example. I.e., this tabular data 24 is stored in an auxiliary storage system 2. Because n columns have been indexed for tabular data 14, n sets of m descriptors (i.e., n first synopses, each including m descriptors) are available in that case. Computing synopses based on the same types of descriptors for the two columns X1, X2 gives rises to second synopses, which happen to match the first two synopses of the tabular data 14 in this example. The matching synopses are surrounded by a dashed line in FIG. 5. Accordingly, a partial match is found between the columns X1, X2 of the relocated tabular data 24.

Any suitable metric can be contemplated to conclude as to a potential match. For example, when comparing S70 the two sets of descriptors, matches may be estimated S75 according to a metric counting, for any pair of compared tables, the number of matching synopses for this pair. This number is conveniently divided by the number of columns of the smallest table. E.g., given a pair of compared tables, where the first table has a smaller number of columns than the second table, the metric may be written as the number of matching synopses (for the two tables) divided by the smallest number of columns in the two tables, as further discussed in section 2.1. In variants, matches may be determined based on similarity measures between pairs of synopses, to allow a more precise quantification of partial matches. In variants to the above metrics, the comparison at step S70 may performed based on distances or correlation coefficients computed between the vectors formed by the descriptors, i.e., between the synopses.

In FIG. 4, reference 26 denote the complete set of synopses, including all descriptor values. The number of descriptors involved in the synopses necessarily impacts the comparison performed at step S70. A large number of descriptors may possibly make the method intractable when large numbers of tables and columns are involved. Fortunately, optimizations are possible, as also discussed in section 2.2. Thus, more sophisticated embodiments can be contemplated, where only a subset of the descriptors of the synopses 261-266 are compared (at step S70) with corresponding subsets of descriptors 16 of the first synopses, i.e., descriptors of the same types. Such comparisons may further be limited to descriptors corresponding to columns of the same type, the aim being to more efficiently identify S75 potential matches between the first tabular data 14 and the second tabular data 24.

Figure 6:
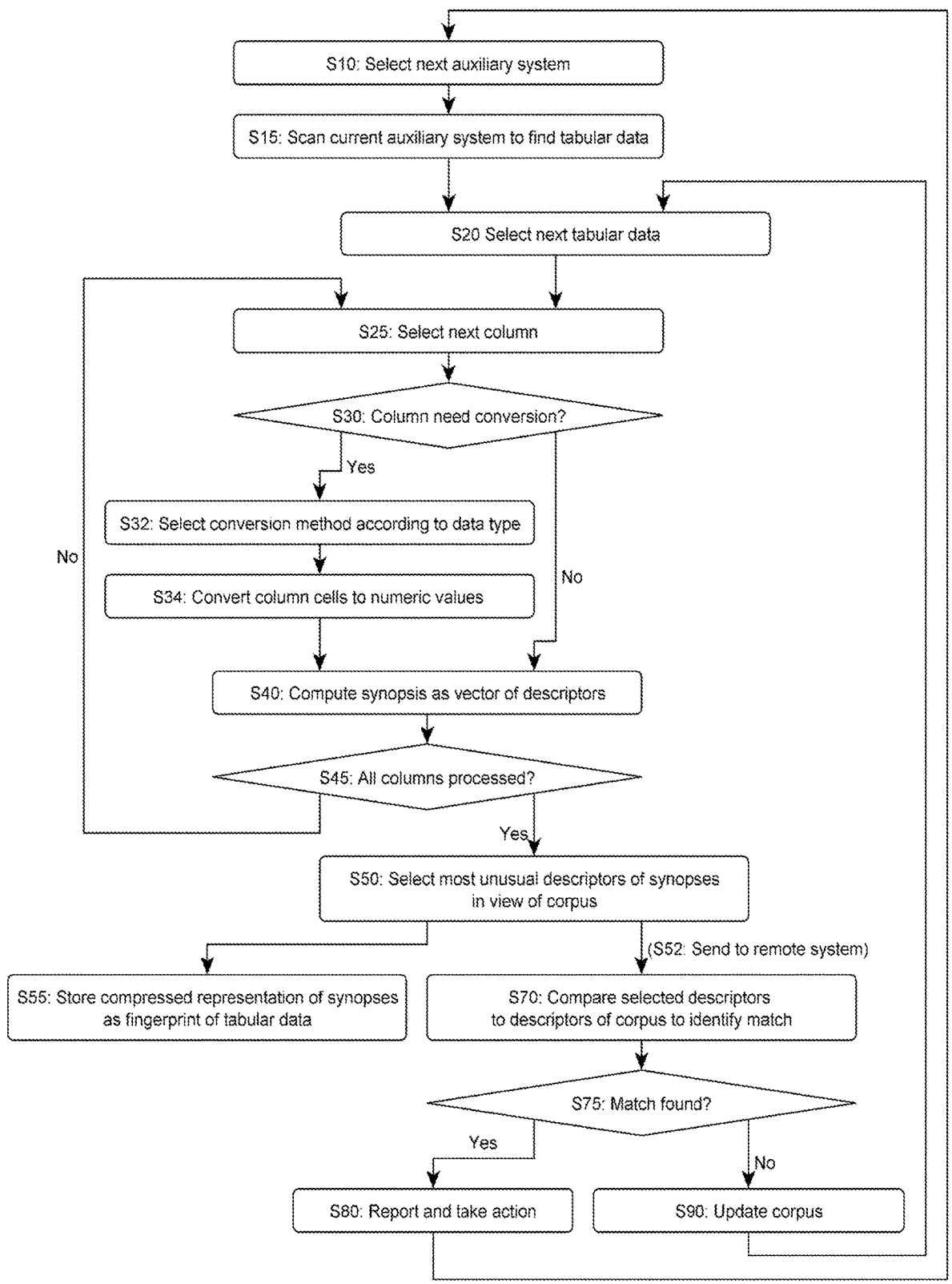
FIG. 6 is a flowchart illustrating high-level steps of a method of tracking tabular data locations, according to embodiments.

Such subsets of descriptors may further be judiciously selected, as now discussed in reference to FIGS. 4 and 6. That is, in embodiments, a subset of the most characteristics descriptors may be identified (step S50), prior to comparing S70 the subsets. E.g., such descriptors may correspond to descriptors having the most unusual values, in view of corresponding descriptors 16 in the corpus 12. To that aim, the method may notably maintain reference values (e.g., means and standard deviations) for the reference descriptors. E.g., a descriptor value that differs by more than q times the standard deviation (where, e.g., q=1, 1.5, or 2) from the average value found in the corpus may be considered as sufficiently unusual to be retained. More generally, the degree of unusualness may be appreciated in view of the distance between a descriptor value and a reference value (e.g., the arithmetic mean for a descriptor of a same type of columns in the corpus). In the fictive example of FIG. 4, the most unusual descriptor values are indicated in bold characters. In general, the subset of descriptors can be restricted to the top K descriptors that are the most unusual, where K is typically larger than or equal to 3, or more.

Thus, the comparison at step S70 may be limited to a few selected descriptors, which eases storage and transfer requirements. Various implementations can be contemplated (e.g., using reference values in place of actual values of non-unusual descriptors), which allow systematic comparisons to be performed at low computational cost, as further discussed below and in section 2.2.

Since only a selection of the descriptors is now relevant, the method does not need to permanently store all the available descriptor values. Rather, the second synopses 261-266 (as obtained at step S40) may be stored S55 as a compressed data structure, which includes the unusual descriptors but discards the remaining descriptor values. For example, one may store unusual descriptor values, together with indexes of the descriptors (corresponding to positions in the m×n table of descriptors in FIG. 4), e.g., as $\{\{4.88, \{1, 5\}\}, \{0.13, \{2, 1\}\}, \{0.67, \{2, 5\}\}\}$ or as $\{\{4.88, 5\}\}, \{0.13, 7\}, \{0.67, 11\}\}$ when using linear indices.

Another possibility is to replace all descriptor values that were found to be insufficiently unusual by reference values (e.g., mean values) from the corpus, e.g., $\{\{\langle f_{1,1}\rangle, \{1, 1\}\}, \{\langle f_{1,2}\rangle, \{1, 2\}\}, \{\langle f_{1,3}\rangle, \{1, 3\}\}, \{\langle f_{1,4}\rangle, \{1, 4\}\}, \{(4.88, \{1, 5\}\}, \{\langle f_{1,6}\rangle, \{1, 6\}\}, \{0.13, \{2, 1\}\}, \ldots, \{0.67, \{2, 5\}\}, \{\langle f_{2,6}\rangle, \{2, 6\}\}\}$, in the example of FIG. 4. In the above array, the notations $\{f_{i,j}\}$ refers to an average value of the ith descriptor for a column of the same type as column j, as obtained from the corpus. A further possibility is to replace the reference values by a "cue", e.g., a string or number "0", indicating that a corresponding reference value is to be used by the comparison algorithm, i.e., $\{0, 0, 0, 0, \{4.88, \{1, 5\}\}, 0, \{0.13, \{2, 1\}\}, \ldots, \{0.67, \{2, 5\}\}, 0\}$, in the example of FIG. 4. In both cases, the data structures obtained allow the selected descriptors to be compared with corresponding descriptors of the first synopses and thereby identify potential matches. Note, the corresponding descriptors in the first synopses may similarly have been (or have to be) replaced by reference values. Another possibility to compress the descriptor data structures is to compute the correlation matrix across the synopses and store the resulting matrix as a fingerprint of the table.

Compressed data structures as described above, or even the mere subset $\{4.88, 0.13, 0.67\}$ of descriptor values, can further be used as a fingerprint of the table (for other purposes than comparisons performed at step S70), given the low probability of collision with another subset of values (assuming a sufficiently large value of K is imposed). I.e., this fingerprint includes the subset of the descriptors selected but discards other descriptor values.

The present methods may be implemented to try and identify tabular data that are stored in inappropriate storage systems, e.g., systems that are available for some purpose but are not appropriate for storing secrets or confidential data, for example. In that case, when a match is found, then the implementing entity may take S80 action in respect of any matching tabular data 24 found. To start with, the entity may possibly report the match, where appropriate (e.g., log the match found in a database), so as allow an owner of the file to be informed. The entity may also prompt the owner to take appropriate remedy action, etc. In addition, the entity may possibly modify user permissions associated to the corresponding file (e.g., to prevent unauthorized users to access the file), relocate, or even delete the file, if necessary.

Still, the present methods may also be applied to the detection of useless duplicates, to save storage. Moreover, a portion of the algorithm discussed in reference to FIG. 6 (namely steps S15 to S55) may be used to initially index tabular data as stored in apposite systems 1. In addition, steps S70, S75, and S90 may be used while progressively expanding the indexing of tabular data by scanning additional storage systems, whereby doubloons and partial matches may need to be detected. In particular, the synopses computed at step S40 for any new table of any scanned storage system may be used to update S90 the already indexed (first) synopses of the corpus 12. The update step S90 may advantageously make use of synopses 261-266 as stored S50 as compressed data structures.

As noted earlier, the present methods may be implemented using a distributed application. Given the various exchanges needed between the various storage systems 1, 2, the present methods may advantageously be performed using a stream-processing, distributed messaging system, such as the Kafka messaging system, e.g., to send S52 the descriptors of the second synopses 261-266 to a remote system, for the latter to perform the comparisons at step S70. More generally, the present methods may be at least partly implemented using a stream-processing software platform such as Kafka.

For completeness, another aspect of the invention concerns a computer program product. This product comprises a computer readable storage medium having program instructions embodied therewith, where the program instructions are executable by processing means, so as to cause the latter to perform steps according to the present methods, i.e., scan auxiliary data storage systems, obtain synopses, and compare sets of descriptors to identify potential matches between the tabular data as stored in the auxiliary data storage systems and data stored in the corpus. This aspect is discussed in detail in section 3.

The above embodiments have been succinctly described in reference to the accompanying drawings and may accommodate a number of variants. Several combinations of the above features may be contemplated. Examples are given in the next section.

This section describe embodiments that allow rectangular datasets to be fingerprinted, such that both copies and derived datasets can be identified with a degree of probability. Such embodiments allow an organization to identify, with some probability, where a specific rectangular dataset has been stored within data stores that it has access to, regardless of how it was moved there, and allowing for the fact that it might have been transformed.

This can advantageously be achieved without changing the data in the datasets, i.e., without watermarking [2]. Moreover, the technique used markedly differs from sliding windows of hashes [1]. The proposed solutions assume that the organization storage systems can be scanned. A synopsis is created for each rectangular dataset found by the scan. As explained in the previous section, the synopsis creation does not operate at the bit level, but on the data level, from the columns of rectangular data. Columns are converted into numeric values, where needed. I.e., some columns may already include suitable numeric values. The conversion may further depend on the type of the columns. For example, integer values may not be converted at all, dates may be turned into numeric timestamps such as Unix timestamps, strings can be hashed using a locality-sensitive hashing technique, etc. The synopsis of a column may include one or more statistical measures of that column and be associated with its original type. A synopsis can be drawn from all the values of a dataset or only a sample. The synopsis of the rectangular dataset (call it the super synopsis) is then the set of synopsis of its columns.

Such synopses allow given datasets to be easily compared with datasets of an existing corpus (section 2.1). If necessary, the most unusual descriptors of the super synopsis can be identified and used as the dataset's fingerprint (section 2.2). In both cases, when a new dataset is scanned, the generated fingerprint is compared against fingerprints of existing datasets. A similarity metric can be used to estimate the degree of similarity.

Consider a relational database table T containing n columns of various types, containing many rows. An entity with access to the data of the table creates column synopses, as explained in section 1. This entity may run as a dedicated entity or may be run as part of a more integrated system such as a metadata catalog, for example. The synopses created are drawn from statistical measures on the columns of the tables. Some of the column types may be converted to make it simpler to perform statically measures on them. Measures such as entropy are robust in that the entropy of the input and the entropy of the hashed input set are similar. Techniques such as locality preserving hashes may be used, for example on strings, to ensure that some other statistical properties of the input are preserved by the hashes. For example, m statistical measures may be achieved for each column, by applying functions $f_1(\cdot), f_2(\cdot), \ldots, f_m(\cdot)$ to each of the columns $C1, \ldots, Cn$.

For each of the n columns, the entity may send the m synopsis as well as the original data type of the column to the system actually performing the measure of similarity, e.g., a backend system, which may conveniently be achieved using a messaging system such as Kafka.

This approach makes it possible to identify whether two datasets are the same or one is derived from the other. It proceeds as follows. If a column from a dataset is present in another dataset, the synopses for that column will be the same. It is extremely unlikely that two different columns would have matching values for all synopses. Thus, a simple metric for the match between two datasets T and U is the function Match(T, U)=100×#ColumnsWithSameSynopses(T,U)/#ColumnsInNarrower(T,U). That is, the function divides the number of matching synopses by the smallest number of columns in the two tables. In other words, Match(T,U) measures a relative overlap between the two datasets, in percentage. Two identical datasets yield a 100% match.

More interestingly, if a dataset V has been obtained by joining two datasets T and U, such that the columns of T are present in V, then V will match 100% the dataset T, as V is a derived copy and T is the narrowest table. If another dataset W has been obtained by removing columns from T, it will also match 100%, as W is also a derived copy and W is the narrowest table of the two. This shows how copies and derived datasets can be identified in the corporate corpus.

Admittedly, this may cause too much data to transfer, store and operate on, depending on the width of the tables and the number of synopses used. Accordingly, the above scheme can be optimized as follows. From among the m×n descriptors drawn from T, we may identify a subset of descriptors that are the most characteristic descriptors and use these to identify T. The values chosen are those that are most unusual for columns of the same type.

As all the values are numeric, simple measures of distinctness can be obtained as a distance from the mean for all measures of the same statistical type applied to the same column type. For example, if a column C1 of T has type "string" and the entropy E of C1 is computed, then E can be compared with the mean of all entropy measures of columns of type "string" already present in the corpus. The entropy value E may eventually be selected as a sufficiently unusual descriptor if it sufficiently departs from the mean, something that may be appreciated in view of the standard deviation, for example, as explained in section 1. One may similarly measure the unusualness of all of the m×n descriptors of T, select the top K descriptors (e.g., K=5), and use such descriptors as T's fingerprint.

Similarly, all datasets in the corpus are characterized by a set of K descriptors. Thus, one may now compare T to all other datasets in the corpus. All tables may be ranked by similarity with all the K descriptors independently. The rank is created by either directly comparing the value—if the comparands contain the same statistical descriptor for the same column type—or using the mean if they do not. In other words, mean values are used as substitutes, replacing the actual descriptor values, which eases the storage and transfer of the descriptor values for the purpose of comparing them.

The tables that are most similar to T are then identified by the combining the K independent rankings, for example by summing the order of each and ordering the result. The tables that are most similar to T appear on top of the list and the degree of similarity to T is the normalized Euclidean distance between the K elements of the fingerprint and the elements in the fingerprint of the table (or the substitute values).

FIG. 6 describes a flow in which auxiliary storage systems are successively S10 scanned and processed for comparisons S70, although they may be processed in parallel. A current auxiliary system 2 is scanned at step S15 to find tabular data. The tabular data are successively processed, see step S20, column by column, see step S25. If a current column needs conversion (step S30: Yes), then a suitable conversion method is selected S32 according to the original data type of the column and the column cells are converted S34 to numeric values according to the selected method, before computing its synopsis S40. Else (step S30: No), the synopsis is directly computed at step S40. A synopsis is obtained as a vector, i.e., a set of descriptors, as explained earlier. Once all columns have been processed (S45: Yes), the most unusual descriptors of the synopses are identified (step S50) in view of the corresponding (e.g., mean) values in the corpus. The selected descriptors may then possibly be sent (step S52) to a remote system for it to perform S70 the comparisons. Compressed representations of all the synopses obtained are stored at step S55; they can be utilized as a fingerprint of the current tabular data, for various purposes. At step S70, the sole selected descriptors are compared to descriptors of the corpus to identify potential matches. Substitute values may be involved in the comparisons, while non-unusual descriptor values do not, as noted earlier. If no match is found (S75: No), the corpus may possibly be updated at step S90, based on the stored (compressed) representation of the synopses, prior to start processing S20 another table on the current storage system 2. If a match is found (step S75: yes), then the comparing entity (e.g., the remote system) may report this and take all necessary actions (relocate, delete, modify permissions, etc.), step S80. The method then moves S10 on to the next storage system 2, and so on. In variants, the corpus is systematically updated, irrespective of whether a match is found at step S75, or not.

This flow corresponds to the scenario described in section 2.2. This flow can be simplified in accordance with the scenario explained in section 2.1. That is, all the descriptor values may be selected at step S50, in view of comparing all the descriptors at step S70. The full data structure would accordingly be stored at step S55.

Computerized systems and devices can be suitably designed for implementing embodiments of the present invention as described herein. In that respect, it can be appreciated that the methods described herein are largely non-interactive and automated. In exemplary embodiments, the methods described herein can be implemented either in an interactive, partly interactive or non-interactive system. The methods described herein can be implemented in software, hardware, or a combination thereof. In exemplary embodiments, the methods proposed herein are implemented in software, as an executable program, the latter executed by suitable digital processing devices. More generally, embodiments of the present invention can be implemented wherein virtual machines and/or general-purpose digital computers, such as personal computers, workstations, etc., are used.

Figure 7:
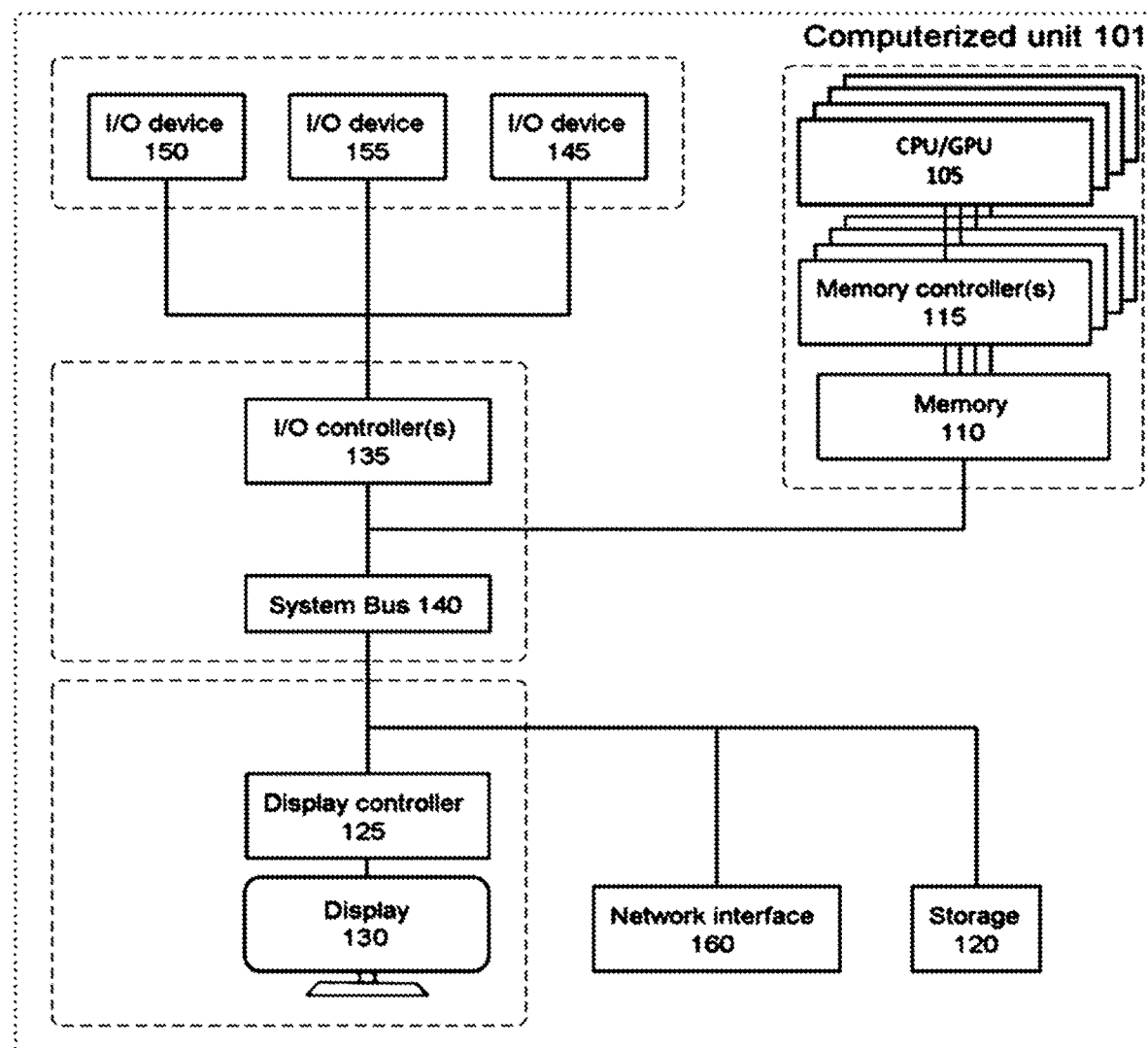
FIG. 7 schematically represents a general-purpose computerized unit, as may be involved in any or each of the reference and auxiliary storage systems of FIG. 1, and suited for implementing one or more method steps as involved in embodiments of the invention.

For instance, the system depicted in FIG. 7 schematically represents a computerized unit 101, e.g., a general- or specific-purpose computer, which may form part of one or more of the reference storage systems 1 and the auxiliary system 2.

In exemplary embodiments, in terms of hardware architecture, as shown in FIG. 7, the unit 101 includes at least one processor 105, a cache memory 112, and a memory 110 coupled to a memory controller 115. Several processors may possibly be involved. To that aim, the processing units may be assigned respective memory controllers, as known per se.

One or more input and/or output (I/O) devices 145, 150, 155 (or peripherals) are communicatively coupled via a local input/output controller 135. The I/O controller 135 can be coupled to or include one or more buses and a system bus 140, as known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor(s) 105 is (are) a hardware device for executing software, particularly that initially stored in memory 110. The processor(s) 105 can be any custom made or commercially available processor(s). The processor(s) include(s) one or more central processing units (CPUs) as well as, possibly, one or more graphics processing units (GPUs). In general, such processors may involve any type of semiconductor-based microprocessor (in the form of a microchip or chip set), or generally any device for executing software instructions.

The memory 110 can include any one or combination of volatile memory elements (e.g., random access memory) and nonvolatile memory elements. Moreover, the memory 110 may incorporate electronic, magnetic, optical, and/or other types of storage media. Note that the memory 110 can have a distributed architecture, where various components are situated remote from one another, but can be accessed by the processor(s) 105.

The software in memory 110 may include one or more separate programs, each of which comprises an ordered listing of executable instructions for implementing logical functions. In the example of FIG. 7, the software in the memory 110 includes computerized methods, forming part of all of the methods described herein in accordance with exemplary embodiments and, in particular, a suitable operating system (OS). The OS essentially controls the execution of other computer programs and provides scheduling, input-output control, file and data management, memory management, and communication control and related services.

The methods described herein (or part thereof) may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 110, so as to operate properly in connection with the OS. Furthermore, the methods can be written as an object-oriented programming language, which has classes of data and methods, or a procedure programming language, which has routines, subroutines, and/or functions.

Possibly, a conventional keyboard and mouse can be coupled to the input/output controller 135. Other I/O devices 145-155 may be included. The computerized unit 101 can further include a display controller 125 coupled to a display 130. In exemplary embodiments, the computerized unit 101 can further include a network interface or transceiver 160 for coupling to a network, to enable, in turn, data communication to/from other, external components.

The network transmits and receives data between the unit 101 and external devices. The network is possibly implemented in a wireless fashion, e.g., using wireless protocols and technologies, such as Wifi, WiMax, etc. The network may be a fixed wireless network, a wireless local area network (LAN), a wireless wide area network (WAN) a personal area network (PAN), a virtual private network (VPN), intranet or other suitable network system and includes equipment for receiving and transmitting signals.

The network can also be an IP-based network for communication between the unit 101 and any external server, client and the like via a broadband connection. In exemplary embodiments, network can be a managed IP network administered by a service provider. Besides, the network can be a packet-switched network such as a LAN, WAN, Internet network, an Internet of things network, etc.

If the unit 101 is a PC, workstation, intelligent device or the like, the software in the memory 110 may further include a basic input output system (BIOS). The BIOS is stored in ROM so that the BIOS can be executed when the computerized unit 101 is activated. When the unit 101 is in operation, the processor(s) 105 is(are) configured to execute software stored within the memory 110, to communicate data to and from the memory 110, and to generally control operations of the computerized unit 101 pursuant to the software.

The methods described herein and the OS, in whole or in part are read by the processor(s) 105, typically buffered within the processor(s) 105, and then executed. When the methods described herein are implemented in software, the methods can be stored in any computer readable medium, such as storage 120, for use by or in connection with any computer related system or method.

The present invention may be a method and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described with reference to a limited number of embodiments, variants and the accompanying drawings, it will be understood by those skilled in the art that various changes may be made and equivalents may be substituted without departing from the scope of the present invention. In particular, a feature recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A computer-implemented method of finding data locations, the method comprising:
 given first synopses of first columns of a corpus of first tabular data stored in one or more reference data storage systems, scanning an auxiliary data storage system to identify second tabular data stored in the auxiliary data storage system, the second tabular data including second columns;
 obtaining second synopses of the second columns of the second tabular data by computing, for each second column of the second columns, a synopsis according to a numeric representation of contents of cells of said each second column, wherein the synopsis includes a vector of m descriptors, $m \geq 1$, each being a measure of said numeric representation;
 sending, via a stream-processing distributed messaging system, at least a subset of the descriptors of the second synopses to a remote system; and
 comparing two sets of one or more descriptors, whereby at least a subset of the descriptors of the second synopses are compared with corresponding descriptors of the first synopses, to identify matches between the second tabular data and the corpus of first tabular data.

2. The computer-implemented method according to claim 1, wherein:
 at comparing the two sets, only the subset of the descriptors of the second synopses are compared with corresponding descriptors of the first synopses to identify the matches between the first tabular data and the second tabular data.

3. The computer-implemented method according to claim 2, wherein the method further comprises:
 prior to comparing the two sets, identifying the subset of the descriptors as descriptors having most unusual values in view of corresponding descriptors of the first synopses of the corpus.

4. The computer-implemented method according to claim 3, wherein the method further comprises:
 storing the second synopses obtained as compressed data structures, the latter including those descriptors having the most unusual values and discarding remaining descriptors.

5. The computer-implemented method according to claim 4, wherein the method further comprises:
 updating the first synopses of the corpus according to the second synopses stored as compressed data structures.

6. The computer-implemented method according to claim 1, wherein:
 at comparing the two sets, all the descriptors of the second synopses are compared with corresponding descriptors of the first synopses to identify said matches.

7. The computer-implemented method according to claim 6, wherein:
 at comparing the two sets, the matches are identified according to a metric counting, for any pair of tables, a number of matching synopses for this pair.

8. The computer-implemented method according to claim 1, wherein:
 comparing the two sets of one or more descriptors comprises computing one of a correlation measure, a distance, and a similarity measure between the two sets of descriptors.

9. The computer-implemented method according to claim 1, wherein:
 computing the synopsis further comprises converting the contents of the cells of said each second column into respective numeric values to obtain said numeric representation, unless the cells already consist of values suitable for obtaining the synopsis.

10. The computer-implemented method according to claim 9, wherein:
 computing the synopsis further comprises, prior to converting said contents, identifying a data type value representative of a type of data contained in the cells of said each second column; and
 said contents are converted into said respective numeric values based on a conversion method selected according to said data type value.

11. The computer-implemented method according to claim 10, wherein:
 the conversion method is selected from one or more of: a hashing method, a locality-sensitive hashing method, a locality-preserving hashing method, and a feature extraction method.

12. The computer-implemented method according to claim 1, wherein the method further comprises, prior to scanning the auxiliary data storage system:
 scanning the one or more reference data storage systems to identify said corpus of first tabular data; and
 obtaining the first synopses by computing, for each first column of the first columns, a synopsis according to a numeric representation of contents of cells of said each first column, wherein this synopsis includes a vector of m descriptors, $m \geq 1$, each being a measure of said numeric representation.

13. The computer-implemented method according to claim 12, wherein:
 the method further comprises updating the first synopses of the corpus according to descriptors of the second synopses obtained.

14. The computer-implemented method according to claim 1, wherein:
 the synopsis computed for each second column includes a vector of $m \geq 2$ descriptors, these including one or more statistical descriptors, each being a statistical measure of said numeric representation.

15. The computer-implemented method according to claim 14, wherein:
 each of the statistical descriptors is computed according to a measure of one of a location, spread, and shape of data values of said numeric representation.

16. The computer-implemented method according to claim 1, wherein:
 the method further comprises taking action in respect of the second tabular data that is found to match any of the first tabular data in the corpus.

17. A computer program product for finding data locations, the computer program product comprising a computer readable storage medium having program instructions embodied therewith, the program instructions executable by processing means, so as to cause the processing means to:
 scan, given first synopses of first columns of a corpus of first tabular data stored in one or more reference data storage systems, an auxiliary data storage system to identify second tabular data stored in the auxiliary data storage system, the second tabular data including second columns;

obtain second synopses of the second columns of the second tabular data by computing, for each second column of the second columns, a synopsis according to a numeric representation of contents of cells of said each second column, wherein the synopsis includes a vector of m descriptors, $m \geq 1$, each being a measure of said numeric representation;

send, via a stream-processing distributed messaging system, at least a subset of the descriptors of the second synopses to a remote system; and compare two sets of one or more descriptors, whereby at least a subset of the descriptors of the second synopses are compared with corresponding descriptors of the first synopses, to identify matches between the second tabular data and the corpus of first tabular data.

18. The computer program product according to claim 17, wherein:

the program instructions are executable to cause the processing means to only compare the subset of the descriptors of the second synopses with the corresponding descriptors of the first synopses.

19. The computer program product according to claim 18, wherein:

the program instructions are executable by the processing means, so as to further cause the processing means to identify the subset of the descriptors as descriptors having most unusual values in view of corresponding descriptors of the first synopses of the corpus, prior to comparing the two sets.

20. A computer system for finding data locations, the system comprising:

a memory; and a processor in communication with the memory, the processor being configured to perform operations to:

scan, given first synopses of first columns of a corpus of first tabular data stored in one or more reference data storage systems, an auxiliary data storage system to identify second tabular data stored in the auxiliary data storage system, the second tabular data including second columns;

obtain second synopses of the second columns of the second tabular data by computing, for each second column of the second columns, a synopsis according to a numeric representation of contents of cells of said each second column, wherein the synopsis includes a vector of m descriptors, $m \geq 1$, each being a measure of said numeric representation;

send, via a stream-processing distributed messaging system, at least a subset of the descriptors of the second synopses to a remote system; and compare two sets of one or more descriptors, whereby at least a subset of the descriptors of the second synopses are compared with corresponding descriptors of the first synopses, to identify matches between the second tabular data and the corpus of first tabular data.

\* \* \* \* \*